Jan. 12, 1932. A. W. RICHES 1,840,332
GLARE SHIELD
Filed June 6, 1927
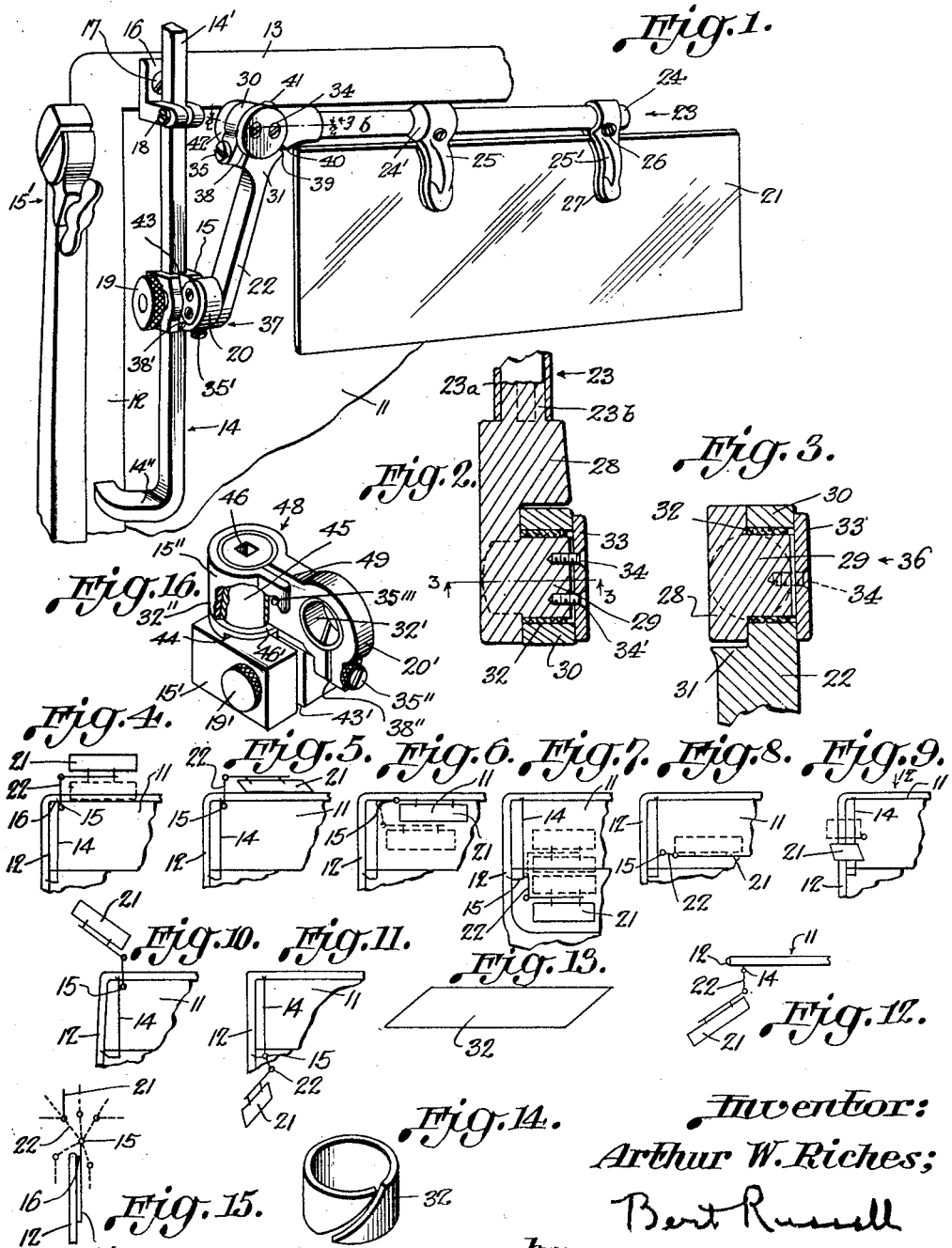
Inventor:
Arthur W. Riches;
Bert Russell
by
Atty.

Patented Jan. 12, 1932

1,840,332

UNITED STATES PATENT OFFICE

ARTHUR W. RICHES, OF LOS ANGELES, CALIFORNIA

GLARE SHIELD

Application filed June 6, 1927. Serial No. 196,881.

Although my present invention is referred to as a glare shield it should be understood that this invention relates more particularly to a flexible arm or joint-containing support by which a plate of glare-reducing glass or the like may be reliably, but yieldably, supported in any one of a great variety of positions of use or disuse; and that this invention includes also a specially constructed and comparatively simple pivotal joint, of hinge type. This joint provides means for so connecting the various sections of supporting arms, or equivalent elements, as to permit of an easy manual change in the angular relationship therebetween while, nevertheless, assuring that any established angular relationship will be satisfactorily maintained in opposition to the action of gravity, or the like,—by reason of a predetermined or adjustable gripping effect, producable by novel means hereinafter described; and it should be understood that the invention last referred to may accordingly be regarded as capable of very wide applicability in predetermining the force or effort required to vary an angular relationship, or yieldably to hold relatively movable parts in such manner that they shall "stay put" until manually or otherwise readjusted.

For use in the general manner above implied, the specific objects of this invention include the provision, in a support suitable for attachment to a windshield (or to a windshield frame or the like) of a fixed element (preferably non-circular in cross-sectional outline) adapted slidably to carry an adjustable bracket; to this bracket I may pivot, for movement in a plane at right angles to the windshield, a sectional arm adapted to carry a glare shield having sufficient strength to permit it to be directly grasped for the purpose of changing its position by a one-hand manipulation; and two or more of the sections of the mentioned arm may be secured or interconnected by variable-grip joints of the novel character above referred to; but it should be understood that my novel joints are believed to be entirely suitable (by reason of their non-sticking, non-vibrating, non-corroding characteristics and their reliability and durability) to be used for a wide variety of purposes (as, in camera "adapters" or in replacement of the lazy-tongs supports provided for telephone instruments—to mention only two out of many possible uses) in addition to those herein set forth.

Other objects of my invention, including the provision of a glare shield organization in which a ray-selecting glass or other antiglare element may be swung either above or below a cylindrical rod (normally held in a horizontal position) and in which either an inner section of said sectional arm or said rod (constituting an outer section of said sectional arm) or the mentioned anti-glare element itself may be directly engaged to vary the elevation or the inclination thereof, or even to shift the same to or from what I may term an "out-board" position, may be best appreciated from the following description of an illustrative embodiment thereof, taken in connection with the appended claims and the accompanying drawings, in which—

Figure 1 may be referred to as a perspective view, in which the uppermost element of a windshield frame is assumed to be substantially at the level of the observer's eye.

Fig. 2 is a detail sectional view, taken substantially as indicated by the line 2—2 of Fig. 1.

Fig. 3 is a similar detail view, taken substantially as indicated by the line 3—3 of Fig. 2.

Figs. 4–11, inclusive, are respectively diagrammatic views, comparable with Fig. 1, but designed to show alternative positions into which my glare shield may be manually moved and in which it may be yieldably held, by means comprising a novel joint or joints, as hereinafter described.

Fig. 12 is a view, comparable with Fig. 9, but taken substantially as indicated by the arrow 12.

Fig. 13 may be referred to as a plan view of a blank, cut from a fibre board of suitable thickness and adapted to be employed in a pivotal manually adjustable joint, of the character above referred to.

Fig. 14 is a perspective view, which may be referred to as illustrating a subsequent stage in the utilization of a blank such as is illustrated in Fig. 13, or as illustrating an alternative blank, cut from tubular stock.

Fig. 15 is a diagrammatic view, on substantially the same scale as Figs. 4–12, but taken from the general direction implied by the arrow 15' of Fig. 1 and showing optional features hereinafter referred to.

Fig. 16 is a perspective detail view with a part broken away to the plane of a vertical kerf, showing optional features hereinafter referred to as providing for the rotation of an entire shield-carrying arm upon a vertical axis.

Referring to the details of that specific embodiment of my invention chosen for purposes of illustration, 11 being a windshield surrounded by a frame comprising an end section 12 and a top section 13, I show as secured thereto a fixed element 14, non-circular in cross sectional outline and adapted to carry an arm-supporting bracket 15.

The fixed element 14 is shown as twice bent, at its lower end; and it may there be retained by any desired means. 14 is shown as adapted to be secured, subsequently to the sliding of the bracket 15 thereon, by means such as an angle clip 16, the latter being shown as retained by a screw or bolt 17 and as provided with a non-circular opening for the reception of the fixed element 14 and with a clamping screw 18, for the secure retention of said fixed element.

The bracket 15, although slidable upon the fixed element 14, may be retained in any desired position thereon by means such as a clamp comprising a screw carrying a milled head 19, or its equivalent; and said bracket is also provided with means such as a shaft-receiving boss or projection 20, suitable for the support of a shield carrying sectional arm in any desired angular adjustment relatively thereto.

For example, I may yieldably support a glare shield 21 (of blue glass or any preferred translucent material) by a flexible arm comprising an inner section 22 and an outer section 23,—the latter being shown as cylindrical in general form and as provided not only with a slight terminal enlargement, 24, but also with shield retaining clips 25, 25',—each of which may comprise a pair of elements adapted to receive screws 26, by which any desired compression may be applied to rubber or other gripping material 27, adapted directly to engage the glass plate 21, or its equivalent.

It will be understood that tightening of the screws 26 may be relied upon not merely to insure the retention of the glass plate 21, or its equivalent, but to predetermine a frictional engagement between the mentioned clips and the rod-like outer arm section 23, or its equivalent; and the latter is shown as connected with the inner arm section 22 by means of a joint comparable with that by which the last mentioned arm section is secured to the bracket 15.

That is to say, the outer arm section 23 is shown as inwardly terminating in an enlargement 28 which provides a male element 29, adapted to be received within a suitably apertured female element 30, provided by an enlargement 31, upon the outer end of the inner arm section 22; and between the coacting elements referred to I interpose a curved-surface friction-assuring element 32, cylindrical or annular in general form.

To retain the last mentioned parts in their assembled relationship, I employ means such as a plate 33, shown as secured by a pair of eccentrically positioned screws 34, 34'; and in order to assure and to vary a gripping effect, secured by an application of pressure to the friction-assuring element 32, I may suitably kerf the female or socket element 30, or its equivalent, and provide thereon clamping means such as a screw 35,—and having a loose-fitting shank.

It will be understood that joints 36 and 37 are similar in construction, except as the movements thereby provided for are practically at right angles to one another,—the contraction-permitting kerfs 38 and 38' being respectively subject to variation in diameter by means such as friction-determining screws 35 and 35'; but I show only the joint 36 as provided with means (in the form of cooperating pairs of stop elements or abutments 39, 40 and 41, 42) for limiting the relative rotative movement of the mentioned arm sections.

It will be seen that, the inner arm section 22 being shown as movable in a fore-and-aft vertical plane, the illustrated engagement between the stop elements 39, 40 may be such as to prevent the outer arm section (when used "inboard") from swinging below a horizontal plane; and an engagement between stops 41 and 42 may similarly limit the descent of the arm 23 when used in an "outboard" position,—as, illustrated in Figs. 9, 10 and 12; but I nevertheless place special emphasis upon my very simple but durable and powerful means, already referred to, for automatically holding the mentioned arm sections, and the glare-excluding element 21, or any other pivotally connected elements, in any position to which the same may be manually or otherwise shifted.

For use in producing a desired frictional resistance to movement in the joints 36, 37 I am at present aware of no other material that is fully equivalent to suitably cut sections of so-called "fibre board", a well known cellulose product, which sections may be prepared either by merely cutting the flat stock into units having the general form illustrated in Fig. 13 or by so slitting short sections of a tubular stock (preferably having originally an outside diameter about equal to that of the male pivot element 29) as directly to produce substantially cylindrical units of the general character shown in Fig. 14.

If desired, means such as an integral collar 24' may cooperate with the mentioned collar or terminal enlargement 24 in preventing endwise movement of the clips 25, 25' during rotative readjustments thereof; but the employment of fibrous cylindrical units within the rod-engaging ends of said clips should be regarded as optional and ordinarily unnecessary in view of the employment of a resilient material at 27; and, in any event, the described construction may be regarded as obviating the necessity for any local reductions in the diameter of the rod 23 and also as entirely obviating any use of tools, or even the use of more than one hand (directly engaging the glare-excluding element 21 or either of the arm sections 22, 23) in shifting said glare shield to any desired elevation and/or to any desired inclination.

As compared with any use of a metallic shim (not preferred, but not entirely precluded) or any other metal-on-metal construction, I find that my use of what I may term a close-fitting "fibre shim", combines the very notable advantages that it (1) obviates corrosion, (2) permits a relatively precise and permanent predetermination of the torque required to effect a readjustment of the angle between the pivotally connected parts (3) that ordinary temperature changes and humidity changes are practically without effect, (4) and that, although said parts may thus be indefinitely retained (in opposition to the action of gravity or a similar force) in a predetermined angular relationship, movements of readjustment, when desired, may be effected not only by a one-hand and direct engagement of mentioned parts, or equivalent parts, but in a smooth and continuous manner,—without appreciable sticking or jerkiness or lost motion or rattling of parts.

Although characteristics just referred to are believed to adapt said joints to a wide variety of alternative uses I have considered it sufficient to illustrate and describe the same only in connection with the support of the glare shield 21,—which may obviously be either translucent or opaque and/or reflecting.

In Fig. 4 I show the bracket 15 as slid upward on the fixed element 14 into engagement with the angle member 16, the arm 22 as upwardly disposed and the glare-excluding element 21 disposed vertically thereabove—as if for cutting off the rays of an afternoon sun, straight in front; and a lower vertical position of the glare-excluding element is indicated in dotted lines; but in Fig. 5, the arm 22 remaining vertical, the element 21 is inclined; and in Fig. 6 the arm 22 is shown as moved into a nearly horizontal (full line) position and into a downwardly-extending position (dotted lines) as might be occasioned by a lowering of the sun toward the horizon.

In Fig. 7 I show the slidable bracket 15, arm section 22 and glare shield element 21 as all lowered to an extreme position,—as might be required to bring the last-mentioned element into the path of a troublesome beam reflected from a hood; and intermediate positions are indicated in dotted lines; but it will be understood that, regardless of the elevation at which the outer arm 23 may be held in a horizontal or other position (as, by engagement between the stops 39, 40) the glare shield element 21 may be swung, at any moment, into a substantially horizontal position of disuse,—such as that in which it is shown in Fig. 8; and I emphasize not only the fact that, for ordinary day driving, the disposition of the glare shield in some position such as the full-line position of Fig. 6 will ordinarily enable a driver not only to watch his road for a suitable distance ahead, but also, by a slight elevation or depression of his head, to look over or below said element for a close and unobstructed view; and but slight and easy readjustment, without tools, need be made incidentally to a change of drivers differing in stature.

Referring to the mentioned positions of the glare-excluding element 21 as "in-board" positions, it will be seen that I illustrate, in Figs. 9-12, inclusive, various "outboard" positions,—an exceptionally high and angular position (involving an engagement between stops 41 and 42) being shown in Fig. 10 (as if for the cutting off of rays from an afternoon sun on the left) an extremely low position (as for the purpose of cutting off rays reflected from water on the left) being shown in Fig. 11, and intermediate positions being suggested in Figs. 9 and 12.

By way of further emphasizing the range of adjustments obtainable by means of the general character described, suggesting in Fig. 1 that the fixed element 14 may be carried to any desired height (as, by the provision of an upward extension 14' thereon, above the securing element 16) I suggest in Fig. 15 the possibility of so positioning the bracket 15, or its equivalent, above said securing element, as to permit the glare-excluding element 21, or its equivalent, to occupy any one of a great variety of alternative positions,—of which a few are indicated by dotted lines; and it will be understood that the glare-excluding element may be shifted, by a one-hand direct engagement between these positions,—and automatically held therein by means of the described joint construction or its equivalent.

The outer arm section 23 may, if desired, comprise a kerfed and/or splined or other tubular member 23a, slidably secured upon a solid or other inner rod 23b,—in such manner as to permit alternatively of its telescopic movement and its secure retention thereon; and the fixed element 14 may comprise a lower portion 14'' having any desired horizontal length (its elongation being effective to carry the upright portion of the "fixed" element 14 toward the right,—in adaption to unusual requirements); but the simple, rugged and comparatively inexpensive bracket 15 shown in Fig. 1 may ordinarily be found so entirely satisfactory as to eliminate from consideration the slightly more versatile but more expensive type of bracket suggested in Fig. 16.

In the latter bracket, a rectangular body 15', provided with a kerf 43' and with a clamping screw having a milled head 19' (these being analogous to the kerf 43 and milled head 19 of Fig. 1) is shown as surmounted by (but largely separated from— see horizontal kerf 44) a cylindrical body 45. This body is shown as provided with a non-circular opening 46 adapting it to slide verticaly upon the fixed element 14, or its equivalent; and, it may be provided with means, such as a fixed collar 46' to prevent axial displacement of a relatively rotatable bracket part 15''. To provide an additional variable-grip joint 48, adjustable by a screw 35'' (to vary a kerf 49) the rotatable part 15'' is shown as integral with a shaft-receiving boss 20', comparable with the mentioned boss 20 and provided with a kerf 38''. This kerf is shown as variable by adjustment of a screw 35''; and friction-assuring elements 32' and 32'', similar to analogous elements above described and similarly adapted for compressive engagement are shown as interposed in clearance spaces provided therefor between the respective male and female elements of these last-described joints,—either of which may be regarded as optional.

It will be obvious that my device may be used on vehicles other than ordinary land vehicles; and that the construction just referred to provides a variable-grip joint which permits some rotation on a vertical axis disposed at right angles to the horizontal axis of joint 37,—to which the axis of joint 36 is in turn perpendicular; but, it being my desire to produce a variable-grip joint which is capable of being so tightened as to produce and to retain any desired degree of rigidity, but which shall suffer no harm when flexed, it will be noted that I entirely avoid, in my pivotal connections, the use of ordinary set screws or serrated clamping means; and it should be also understood that, unless in regions or periods of very extreme temperature changes, the respective screws 35, 35', etc., may actually remain untouched, after suitable adjustment, throughout an entire season, and even though the vehicles equipped with my glare shield supports be obliged to traverse comparatively rough roads.

I herein apply the term "flexible" to joints which may yield under manual pressure directly applied to an outer member thereof; and, in the last connection I may mention, in conclusion, that I consider it ordinarily advantageous to tighten the screws 26 less firmly than the screw 35, and to tighten the screw 35' more firmly than the screw 35 but less firmly than the screw or screws 35'', 35''', and/or otherwise to provide (as, by a progressive increase in the diameters of the respective female members) for rendering the inner joints somewhat stiffer-working than the outer joints of my glare-shield support. Thus, to assure instant appreciation, I prefer initially to so adjust the mentioned joints that a moderate thumb pressure may be effective merely to change the inclination of the shield element 21, or its equivalent; a slightly greater pressure, directly applied, may then suffice to tilt the outer arm section 23 relatively to the inner arm section 22; more power may be required to lift or to depress the latter; and, in order to manipulate the joint 48 (when provided) it may be necessary to use the arm sections 22 as a lever. That is to say, the inner joints are progressively less flexible.

Although I have herein described a single complete embodiment of my invention, suggesting various optional features, it should be understood not only that various features of my present invention are capable of independent use but also that numerous modifications, additional to those suggested herein might easily be devised, in the light of my present description, by workers skilled in the art to which this case relates, and without the slightest departure from the spirit and scope of my invention, as the same is set forth above and in the following claims.

Reflection and refraction of light rays thereby may naturally be taken into consideration in determining the best position for the glare shield 21, or its equivalent. I find it ordinarily advantageous, in day driving, to dispose said shield, when used to cut off the sun's rays, in a dependent position relatively to the rod 23—which then produces no "blind spot" opposite any portion of the road; but I am aware of no consideration unfavorable to the use of the shield 21 in an upstanding position when it is carried at the low level which is suitable to night driving.

I claim as my invention:
1. In means suitable for the support of a glare shield relatively to the windshield of a vehicle; a supporting element fixed to said windshield; means for gripping said glare shield; and a sectional arm interposed between said fixed element and said gripping means and comprising an inner arm section and an outer arm section which are interconnected by a joint, of hinge type, provided with means for precisely determining the rigidity thereof, said joint comprising a male element and a female element having a clearance space therebetween and a substantially cylindrical friction-assuring element, formed of a fibrous stock having substantially uniform thickness, disposed in said clearance space.

2. In a flexible support; a fixed member provided with means for its attachment to a frame; a vertically adjustable bracket carried thereby; means for engaging an element to be supported; and a sectional arm pivotally connected with both said last mentioned means and said bracket,—said bracket and an inner arm section being each provided with one element of a variable-grip joint, of hinge type, permitting pivotal movement of said arm when manually engaged, in a vertical plane substantially at right angles to the plane of said frame said joint including annular fibrous friction means and means for varying at will the force prerequisite to such pivotal movement.

3. In a flexible support; a fixed member provided with means for its attachment to a frame; a vertically adjustable bracket carried thereby; means for engaging an element to be supported; and a sectional arm pivotally connected with both said last mentioned means and said bracket, said bracket and an inner arm section being each provided with one element of a variable-grip joint, of hinge type, permitting pivotal movement of said arm in a plane substantially at right angles to the plane of said frame and the respective sections of said arm being pivotally connected with one another and with said engaging means by variable-grip joints of hinge type, each comprising means which hold the same against gravity but which permit manual readjustment by direct engagement of a section to be moved.

4. In a flexible support; a fixed member provided with means for its attachment to a frame; a vertically adjustable bracket carried thereby; means for engaging an element to be supported; and a sectional arm pivotally connected with both said last mentioned means and said bracket, said bracket and an inner arm section being each provided with one element of a variable-grip-joint, of hinge type, permitting pivotal movement of said arm in a plane substantially at right angles to the plane of said frame, and the respective sections of said arm being pivotally connected with one another and with said engaging means by like joints of hinge type, each comprising means which hold the same against gravity but which permit manual readjustment by direct engagement of a section to be moved, and inner joints being stiffer-working than outer joints.

In witness whereof, I have hereunto affixed my signature.

ARTHUR W. RICHES.